United States Patent [19]
Mullins

[11] 3,735,946
[45] May 29, 1973

[54] AIRCRAFT ENGINE MOUNTINGS

[75] Inventor: John Albert Mullins, Chellaston, Derby, England

[73] Assignee: Rolls Royce Limited, Derby, England

[22] Filed: July 7, 1971

[21] Appl. No.: 160,318

[30] Foreign Application Priority Data

July 9, 1970    Great Britain......................33,316/70

[52] U.S. Cl..........................................244/54, 244/55
[51] Int. Cl..........................B64d 27/18, B64d 27/20
[58] Field of Search..........................244/54, 53 R, 55, 244/135 R; 60/39.31

[56] References Cited
UNITED STATES PATENTS

| | | | |
|---|---|---|---|
| 2,421,699 | 6/1947 | Johnson | 244/135 R |
| 2,863,620 | 12/1958 | Vautier | 244/55 |
| 3,098,632 | 7/1963 | Christenson | 244/135 R |
| 3,188,025 | 6/1965 | Moorehead | 244/55 |
| 3,638,421 | 2/1972 | Chilman | 244/54 |

FOREIGN PATENTS OR APPLICATIONS 1,093,050   11/1967   Great Britain..........................244/54

Primary Examiner—Milton Buchler
Assistant Examiner—Barry L. Kelmachter
Attorney—Cushman, Darby & Cushman

[57] ABSTRACT

A multi engined aircraft is provided with standardized engine mounting points which enables an engine to be removed from one side of the aircraft and fitted to the opposite side thereof, so as to broaden the range of engine interchangeability.

3 Claims, 2 Drawing Figures

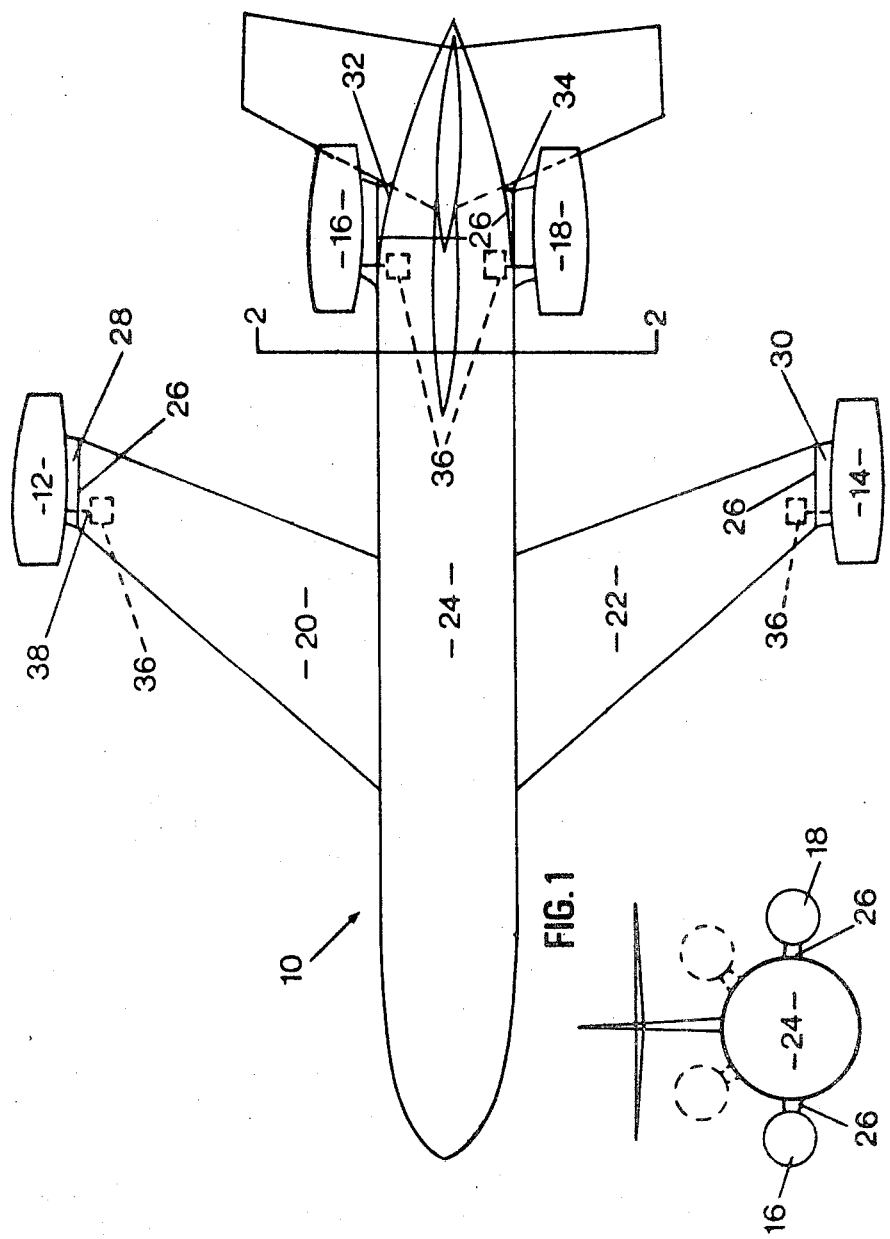

AIRCRAFT ENGINE MOUNTINGS

This invention concerns aircraft engine mountings.

In the interest of economy and simplicity of operational servicing, multi engined aircraft have been designed such that engines thereon having common support means e.g. wings or fuselage, may be interchanged, positionally, that is, an engine or engines on one wing be changed for an engine from a corresponding position on another wing. Moreover an engine mounted on one side of a fuselage may be changed for an engine mounted on the opposite side thereof. However, so far as is known, it has hitherto been impossible to design an aircraft, having engines mounted on both wings and fuselage, all of which engines are fully interchangeable, one with another irrespective of position and it is an object of this invention to provide such an aircraft.

Accordingly the present invention comprises, in combination, an aircraft and a plurality of engines each engine having mounting means whereby it can be mounted on either wing tip or on the fuselage of the aircraft all of which are commonly adapted to receive any one of said mountings in mating engagement.

Preferably the mounting means comprises a stub wing member one end of which is fastened to a respective engine and the other end of which is identical in chordal profile with the chordal profile of each wing tip.

Preferably at least one portion of the fuselage is shaped so as to be identical with the chordal profile of each wing tip.

Preferably the accessories which are normally mounted on and driven by the engine, are mounted in the wings and fuselage of the aircraft, adjacent the mounting positions of a respective engine.

The invention will now be described with reference to the accompanying drawings in which:

FIG. 1 is a plan view of an aircraft having engine mountings in accordance with the invention, FIG. 2 is a view on line 2—2 of FIG. 1.

In FIG. 1 an aircraft 10 is powered by four gas turbine engines 12, 14, 16 and 18. Engines 12 and 14 are each mounted on the tips of wings 20 and 22 respectively, while engines 16 and 18 are mounted on the starboard and port sides respectively of the fuselage 24 of aircraft 10.

In order to facilitate simplicity of servicing of the aircraft by the operator each engine is provided with mounting means 26 the shape and features of which are common to all of the engines on the aircraft 10. Thus each engine 12, 14, 16 or 18 can be interchanged with each other, regardless of the position on the aircraft in which it is desired to mount the engines.

The mounting 26 comprises a stub wing member, one end of which is fixed to the engine so as to bend smoothly with the engine outer profile so as to minimize drag, the other end being machined substantially flat except for such location features as spigots or recesses (not shown) whereby the stub wing is attached to aircraft 10.

The chordal profile of each stub wing member 26 is formed to a shape identical with the chordal profile of the tips 28 and 30 of wings 20 and 22 respectively. Moreover, protuberant portions 32 and 34 are formed each side of fuselage 24. The opposed surfaces of protuberant portions 32 and 34 are machined substantially flat as are the opposed ends of wing tips 28 and 30, except for spigots or recesses (not shown) which may be required to align with the spigots and recesses on each stub wing member 26 for the purpose of location and locking of the respective engines to the aircraft. The proud portions 32 and 34 are also provided with a chordal profile which is identical with the chordal profile of wing tips 28 and 30.

Thus it will be seen that all the engines 12, 14, 16 and 18 have mounting means which are in common with each other in all respects and that wing tips 28 and 30 and fuselage have stub wing receiving surfaces which are commonly shaped, making it possible for any one of engines 12, 14, 16 and 18 to be mounted on any one of those surfaces.

In order to simplify interchangeability still further, those accessory units driven by the engine of an aircraft and which, normally, are mounted on the engine, may be permanently fixed within the wings or fuselage as indicated diagrammatically at 36, a drive shaft 38 being led from the engine, to the accessory unit and removably connected thereto by a sliding splined joint (not shown) or the like.

It will be appreciated by those skilled in the art that where, in accordance with the present invention an engine 14 on the port side of the aircraft 10 is changed to a position on the starboard side thereof, the engine will then in fact, be operating upside down, having been rotated through 180° during changeover. Thus it will be necessary to duplicate such engine internal features as oil and fuel drains so that there are such features provided regardless of which side of the aircraft the engine is operating on.

Protuberant portions 32 and 34 are not restricted to positions diametrically opposite each other on fuselage 24. As can be seen in FIG. 2 they can be placed elsewhere on the fuselage and if required and if the aircraft rudder design is suitable, only one engine may be mounted, say on top of the fuselage rather than two engines placed equi-angularly about the aircraft roll axis.

I claim:

1. In combination: an aircraft having a fuselage, wings and a plurality of engines, said wings having wing tips which are flat in a chordwise direction and which have identical chordal profiles, each of said chordal profiles being symmetrical about the chord axis of the same, said fuselage having at least one protuberance thereon which has a tip which is substantially flat, said flat tip having a chordal profile identical with the chordal profiles of said wing tips, each of said engines having mounting means integral therewith, said mounting means comprising stub wing shaped member having a substantially flat end with an identical chordal profile to the chordal profile of said wing tips and said protuberance tip whereby any of said plurality of engines may be mated to and locked to any of said wing tips or said protuberance tip.

2. A combination as claimed in claim 1 including engine accessories means mounted within said wings and said fuselage for said respective engines and drive means extending from each of said engines through its respective stub shaped member to the respective engine accessory means.

3. A combination as claimed in claim 2 in which each of said engines has duplicate and oppositely disposed oil and fuel drain means.

* * * * *